United States Patent [19]
Uchiyama et al.

[11] Patent Number: 5,828,021
[45] Date of Patent: Oct. 27, 1998

[54] POLE PANEL FOR SWITCHES AND FABRICATION METHOD THEREOF

[75] Inventors: Norio Uchiyama; Takeshi Shibata, both of Tokyo, Japan

[73] Assignee: Niles Parts Co., Ltd., Tokyo, Japan

[21] Appl. No.: 718,942

[22] Filed: Sep. 24, 1996

[30] Foreign Application Priority Data

Oct. 9, 1995 [JP] Japan .................................. 7-287877

[51] Int. Cl.⁶ .............................. H01H 3/16; H01H 9/00; H01H 1/64
[52] U.S. Cl. .................................. 200/61.54; 200/61.27; 200/293
[58] Field of Search .............................. 200/61.54, 61.27, 200/292, 293, 294, 307

[56] References Cited

U.S. PATENT DOCUMENTS

| | | | |
|---|---|---|---|
| 3,641,493 | 2/1972 | Suzuki et al. ........................ | 200/61.27 |
| 3,944,765 | 3/1976 | Kawai et al. ........................ | 200/61.54 |
| 4,293,743 | 10/1981 | Iwata et al. ........................ | 200/61.54 |
| 4,379,954 | 4/1983 | Iwata et al. ........................ | 200/61.27 |

*Primary Examiner*—Peter S. Wong
*Assistant Examiner*—Bao Q. Vu
*Attorney, Agent, or Firm*—Ronald P. Kananen

[57] ABSTRACT

There is disclosed a pole panel for switches in which electric components or the like are mountable by providing a substrate on the underside of the pole panel. A combination switch has a switch case 7 detachably attached to a base. The switch case 7 has an operating lever 1 pivotally supported thereon for swing operation. A pole panel 9 is provided on the underside of the switch case 7, and has fixed contacts 14 in contact with a movable panel 6. The pole panel 9 has an opening 9h formed in the underside thereof so that terminals 15b respectively integrated with the fixed contacts 14 project into the opening 9h, with a substrate 16 provided for covering the opening 9h.

11 Claims, 4 Drawing Sheets

POLE PANEL FOR SWITCHES AND FABRICATION METHOD THEREOF

BACKGROUND OF THE INVENTION

1. Field of the Invention

This invention relates generally to switches and, in particular, to an improved pole panel for a switch, such as a combination switch of an automobile.

2. Description of the Prior Art

Conventionally, there has been a technique of this kind disclosed by Japanese Utility Model Unexamined Application (Kokai) No. H6-36173. This technique involves a combination switch for automobiles having an operating lever pivotally supported on a switch case for swing operation. The switch case has bases received by the steering column from both sides thereof for screw-fixing thereto. The switch case has a movable panel placed therein to fit at the underside thereof with a pole panel having insert-formed fixed contacts. The pole panel has a connector provided in the underside thereof.

In the conventional technique, however, the switch case and the pole panel have to be made small in size, because the switch case is dismountably mounted on the base. To this end, there is present a problem that a substrate mounting with a flasher unit or the like cannot be installed on the underside of a body of the combination switch, as in the combination switch of Japanese Utility Model Unexamined Application (Kokai) No. S59-85545 having a body integrating a switch case with the base.

SUMMARY OF THE INVENTION

The present invention has been made to solve the above-stated problem encountered in the conventional art.

It is therefore the object of the present invention to enable mounting of an intermittent wiper unit or the like for constituting a combination switch having a switch case detachably attached to a base by providing a substrate on the underside of a pole panel situated beneath the switch case.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, there is provided a pole panel for a combination switch having a switch case on which an operating lever is pivotally supported for swing-operation, a base having the switch case detachably attached by receiving therein, and a pole panel arranged on the underside of the switch case so that fixed contacts of the pole panel are in contact with movable contacts, the pole panel comprising an opening formed in an underside of the pole panel, terminals respectively formed integral with the fixed contacts to project into the opening, and a substrate provided to cover the opening.

Also, the terminals of the pole panel may be inserted through the substrate for being soldered at the underside thereof, the substrate has electric components mounted thereon, and the electric components have terminals all of which are inserted through the substrate for being soldered at the underside thereof.

The electric component may comprise a flasher unit or an intermittent wiper unit.

According to the present invention, there is further provided a method of fabricating a pole panel for a switch having a switch case on which an operating lever is pivotally supported for swing-operation, a base having the switch case detachably attached by receiving therein, and a pole panel arranged on the underside of the switch case so that fixed contacts of the pole panel are in contact with movable contacts, the method comprising the steps of:

an opening process of forming through-openings in a substrate to substantially follow the contour of an opening in an underside of the pole panel;

a cutting process of forming V-grooves along extension of a straight line connecting between the through-opening and the through-opening;

a parts-mounting process of inserting from the above terminals of electric components and terminals of the pole panel into through-holes of the substrate;

a soldering process of soldering the terminals of the electric components and the terminals of the pole panel projecting from an underside of the substrate; and a cutting process of cutting along the V-grooves formed in the substrate.

The soldering process may be done with a connector opened downward of the pole panel covered over by the substrate, and the cutting process is carried out by cutting away a portion of the substrate covering over the connector.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
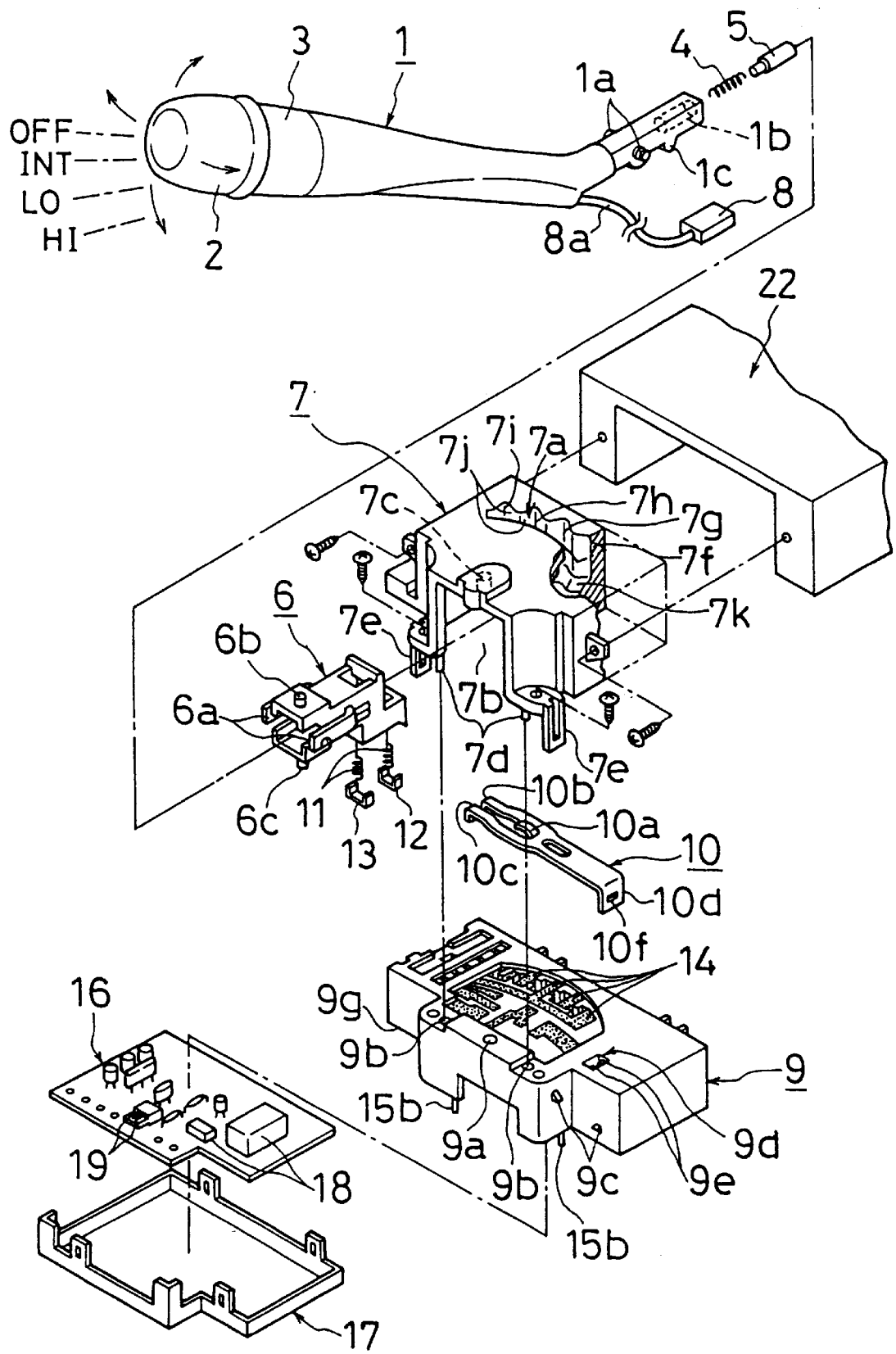
FIG. 1 is an exploded perspective view of a pole panel for switches according to a preferred embodiment of the present invention.
Figure 2:
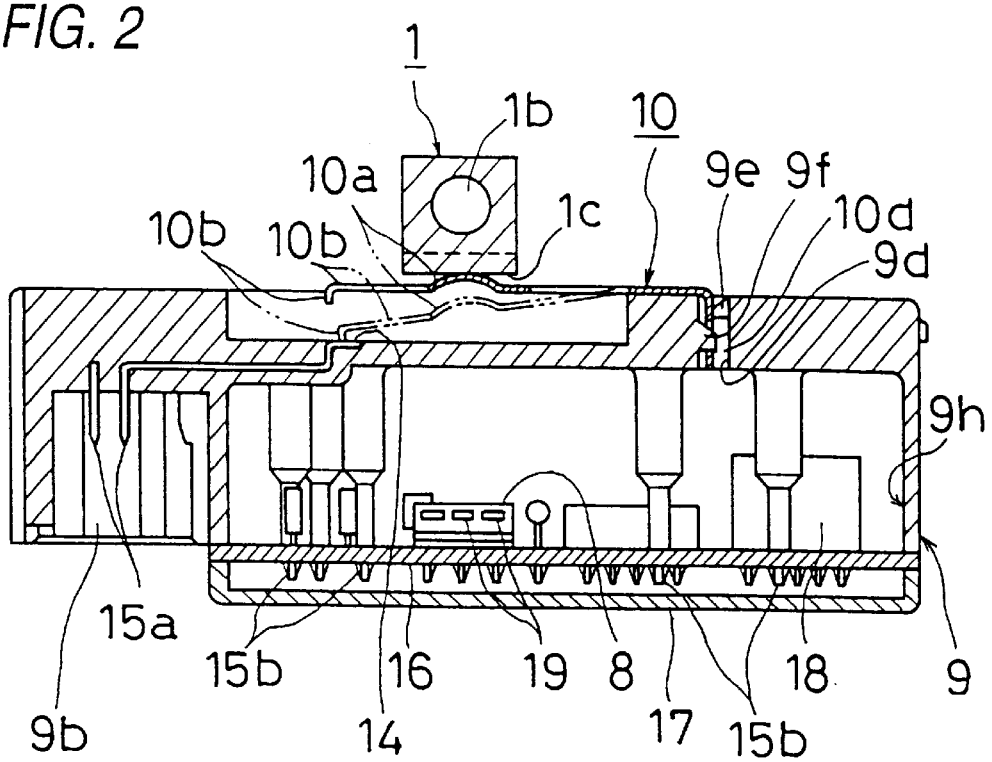
FIG. 2 is an enlarged central cross-sectional view of a pole panel provided with a substrate showing the preferred embodiment of the present invention.
Figure 3:
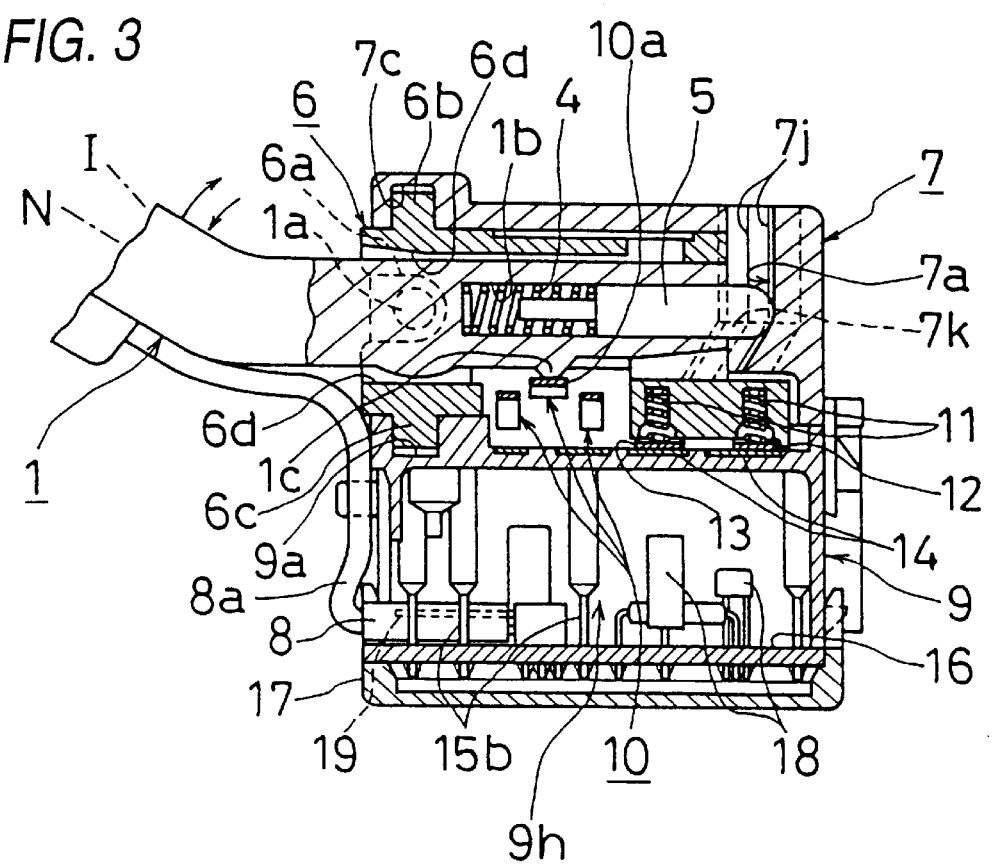
FIG. 3 is an enlarged cross-sectional view showing the preferred embodiment of the present invention.

There is illustrated in FIGS. 1 to 3 a pole panel for switches according to one preferred embodiment of the present invention, on which description is made in detail hereinbelow.

Reference numeral 1 is an operating lever for a so-called combination switch. The combination switch involves a wiper switch, turn-signal switch, or other type of switch, which is mounted on a base 22 firmly fixed onto a steering column (not shown) of an automobile. The operating lever 1 has a blind hole 1b formed at one end thereof to receive therein a nodal member 5 via a spring column 4, as shown in FIG. 1. The operating lever 1 also includes at the other end an intermittent wiper volume 2 as a rotary switch and a rear-wiper washer switch 3.

The operating lever 1 has a cord 8a inserted therein, which cord 8a is connected to the intermittent wiper volume 2 and the rear-wiper washer switch 3. The cord 8a is also connected to a connector 8. The connector 8 is to be connected to a male connector 19 installed on a substrate 16, as described below. The operating lever 1 is allowed to rotate upward and downward about support shafts 1a, as shown in FIGS. 1 and 2. The upward swinging of the operating lever 1 causes actuation of a wiper washer. The operating lever 1 is inserted at its one end in a movable panel 6 with the axis 1a thereof pivotally supported by axis-support pieces 6a formed in respective lateral faces of the movable panel 6.

The operating lever 1 is also allowed to rotate forward and backward about support shafts 6b, 6c provided in the movable panel 6. The operating lever 1 is arranged for being held at respective positions of wiper stoppage (OFF), wiper intermittent operation (INT), wiper low-speed operation (LO), and wiper high-speed operation (HI), when it is moved forward or backward.

The movable panel 6 is inserted in a recessed cavity 7b formed in a lateral face of a switch case 7. The movable panel 6 has the respective support shafts 6b, 6c formed projecting from the upper and lower faces thereof so that it is allowed to rotate forward and backward, together with the operating lever 1, about the support shafts 6b, 6c. The support shaft 6b of the movable panel 6 is pivotally aligned to a shaft hole 7c formed in an upper wall over the recessed cavity 7b, while the support shaft 6c is pivotally aligned to a shaft hole 9a provided in a pole panel 9. The movable panel 6 has movable contact plates 12, 13 for engagement with a surface on the lower side of a nodal face 7a through springs 11.

The switch case 7 is fitted in a base 22 which is screw-fixed on the steering column. The switch case 7 has projecting positioning rods 7d formed on the bottom face thereof for being fitted into blind holes 9b, and engaging pieces 7e formed in the periphery thereof for being engaged with claws 9c so that the switch case 7 is screw-fixed on the polarity panel 9. The nodal surface 7a comprises wiper-switch nodal grooves 7f, 7g, 7h, 7i for holding the operating lever 1 in the wiper stoppage position (OFF), the wiper intermittent operation position (INT), the wiper low-speed operation position (LO), and the wiper high-speed operation position (HI), respectively. Further, each of these nodal grooves 7f, 7g, 7h, 7i is formed by a vertical surface 7j and a slant surface 7k. The nodal surface 7a is provided on a wall on the inner deep side of the recessed cavity 7b. Thus, the nodal surface 7a is formed by vertically extending grooves which are continuous in an arc form as shown in FIG. 1.

The nodal groove 7f serves for holding the operating lever 1 in the wiper stoppage position (OFF). The nodal groove 7g is for holding the operating lever 1 in the wiper intermittent operation position (INT). The nodal groove 7h is for holding the operating lever 1 in the wiper low-speed operation position (LO). The nodal groove 7i is for holding the operating lever 1 in the wiper high-speed operation position (HI).

The vertical surface 7j serves to maintain an OFF state for the wiper washer. The vertical surface 7j is vertically provided in an upper portion of each nodal groove 7f, 7g, 7h, 7i on the inner deep side of the recessed cavity 7b. Meanwhile, the slant surface 7k, when the operating lever 1 is shifted upward, is brought into pressure-contact with the nodal member 5, providing a nodal-contact feeling. The slant surface 7k also causes the operating lever 1 to automatically return to a neutral position (N), when the lever 1 is released from gripping. The operative position where the nodal member 5 is in pressure-contact with the slant surface 7k constitutes a position for actuating the wiper washer. The slant surface 7k is a continuously formed slant in the lower portion of each nodal groove 7f, 7g, 7h, 7i.

The pole panel 9 is formed with a fixed contact 14 and terminals 15a, 15b inserted thereto. The pole panel 9 has the movable panel 6 and a movable contact piece 10 mounted on the top surface thereof, and a cover 17 fitted on the bottom surface via a substrate 16. The pole panel 9 has a through-hole 9d opened for fixing the movable contact piece 10. Convex portions 9e are formed on opposite sides of the upper opening portion of the through-hole 9d, for pressure-contact with an engaging portion 10d of the movable contact piece 10. In the through-hole 9d, a claw 9f is formed for engagement with a hole 10f of the movable contact piece 10.

The movable contact piece 10 is formed of metallic conducting material so that an engaging portion 10d thereof leftward bent in an L form is press-fitted into the through-hole 9d, enabling ready fixing onto the pole panel 9. Incidentally, although the movable contact piece 10 has an operating portion 10a, a contact 10b, and a contact 10c formed in a three-fork form, these portions may be formed integrated into one. The purpose of use for the movable contact piece 10 is not particularly limited. It is possible for the movable contact piece 10 to use the contact 10b as a so-called mist operating contact and the contact 10c as a wiper-washer operating contact by placing the neighborhood of the engaging portion 10d into contact with a fixed contact 14.

The movable contact plates 12, 13 are brought into contact with respective ones of the fixed contacts 14, when shifting the operating lever 1 forward and backward. The fixed contacts 14 each have an upper end thereof exposed out of the pole panel 9, and a lower end thereof connected to associated terminals 15a, 15b by forming integrally or fusing therewith. The fixed contacts 14 are wiper contacts with which the movable contacts 12, 13 are brought into contact when the operating lever 1 is shifted to the wiper stoppage position (OFF), the wiper intermittent operating position (INT), the wiper low-speed operating position (LOW), or the wiper high-speed operating position (HI).

It is also possible to use the movable contact piece 10, the movable contact plates 12, 13, and the fixed contacts 14 for contacts for a headlight switch, a dimmer switch, a passing switch, a turn-signal switch, or others, instead of a contact for a wiper washer switch.

The terminal 15a has its lower end projecting into a connector 9g of the pole panel 9. The terminal 15b, projecting through an opening 9h formed on the underside of the pole panel 9, is soldered in the through-hole 16a of the substrate 16. The substrate 16 has electric components, such as relays and ICs, and a male connector 19 mounted thereon. The substrate 16 is interposed between the pole panel 9 and the cover 17 so as to close the opening 9h of the pole panel 9. The cover 17 is in engagement with the pole panel 9. The electric components 18 involve, for example, a flasher unit, or an intermittent wiper unit.

Next, a method of forming the substrate 16, as well as a method of combining the substrate 16 and the pole panel 9, will be described in detail by referring to FIGS. 4 to 6.

Figure 4:
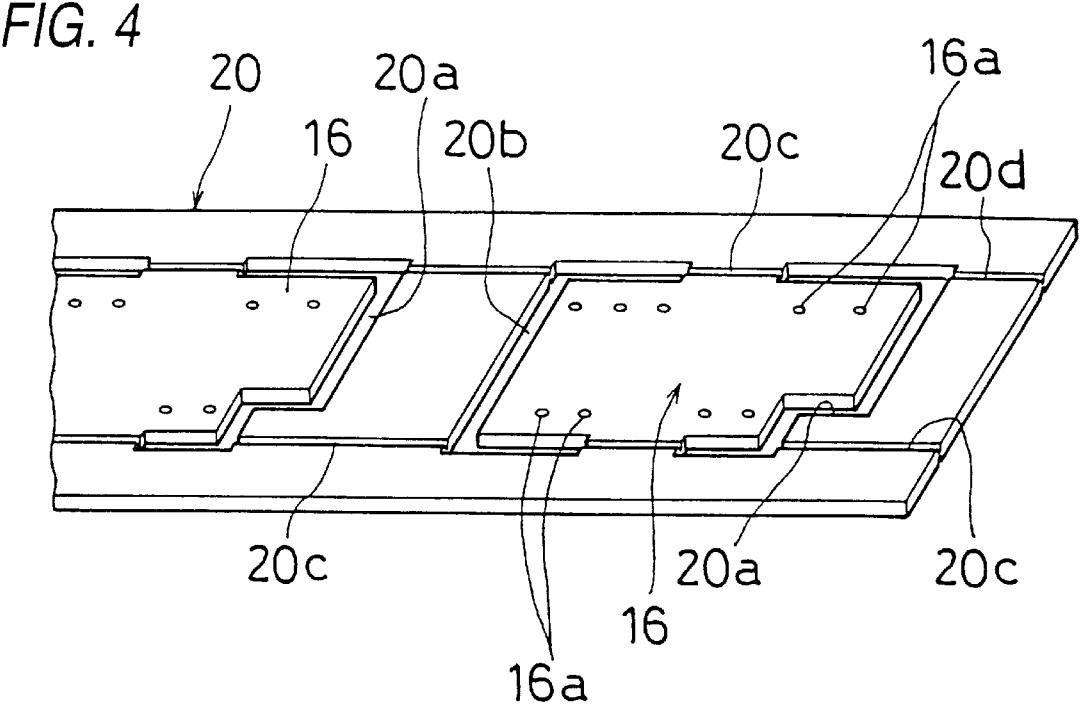
FIG. 4 is an enlarged cross-sectional view of the substrate showing the preferred embodiment of the present invention.
Figure 5:
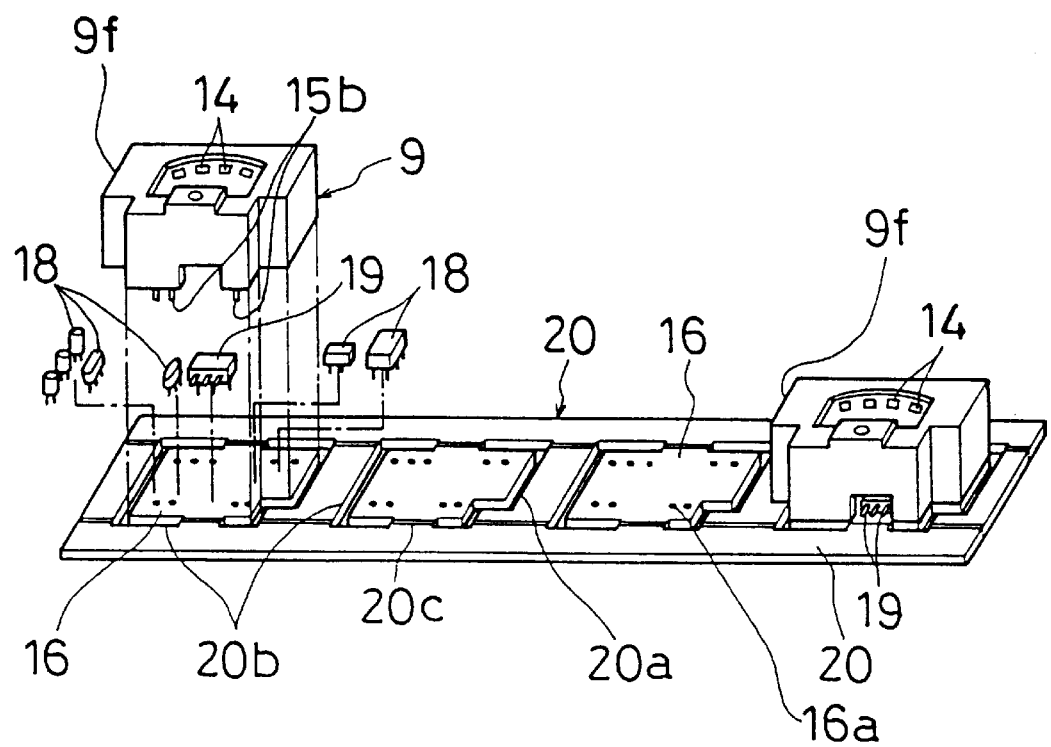
FIG. 5 is an exploded perspective view of the substrate onto which electric components, and so forth, are to be mounted, showing the preferred embodiment of the present invention.

Referring to FIGS. 4 and 5, a printed substrate 20 of resin or the like for forming a main body of the substrate 16 is first cut to such a desired area that the printed substrate 20 has a plurality of pole panels 9 to be mounted thereon, as shown in FIG. 5. The printed substrate is then subjected to etching on a conductor leaf formed thereon. Thereafter, the printed board 20 is silk-printed with an electrically nonconducting material, such as an epoxy resin, over the surface thereof.

Then, through-holes 16a are formed open through the printed board 20. The printed substrate 20 is subjected to a process of forming a plurality of through-openings 20a, 20b such that they substantially follow the contour of the opening 9h on the underside of the pole panel 9. The through-openings 20a and 20b comprise elongate holes which cooperatively provide four corners for the periphery of the substrate 16. The number and the shape of the through-openings 20a, 20b are not limited, but will be satisfactory if the line defined by the through-openings 20a, 20b and V-grooves 20c, 20d eventually matches the contour of the substrate 16. Then, a process of forming the V-grooves 20c, 20d is carried out along extension of a straight line between the through-opening 20a and the through-opening 20b on one or both surfaces of the printed substrate. Incidentally, the V-grooves 20c, 20d may be constituted by a line other than a straight line.

Then, a parts-mounting process is performed by inserting from the above lead terminals of electrical components 18 and male connector 19, as well as terminals 15a, 15b projecting from the underside of the pole panel 9 into through-holes 16a. All of the terminals of these electric components 18 and male connector 19 are inserted from the above relative to the substrate 16 into the through-holes 16a, as shown in FIG. 5. Then, the pole panels 9 are each mounted on the printed substrate 20 with the terminals 15b thereof inserted into the associated through-holes 16a.

Figure 6:
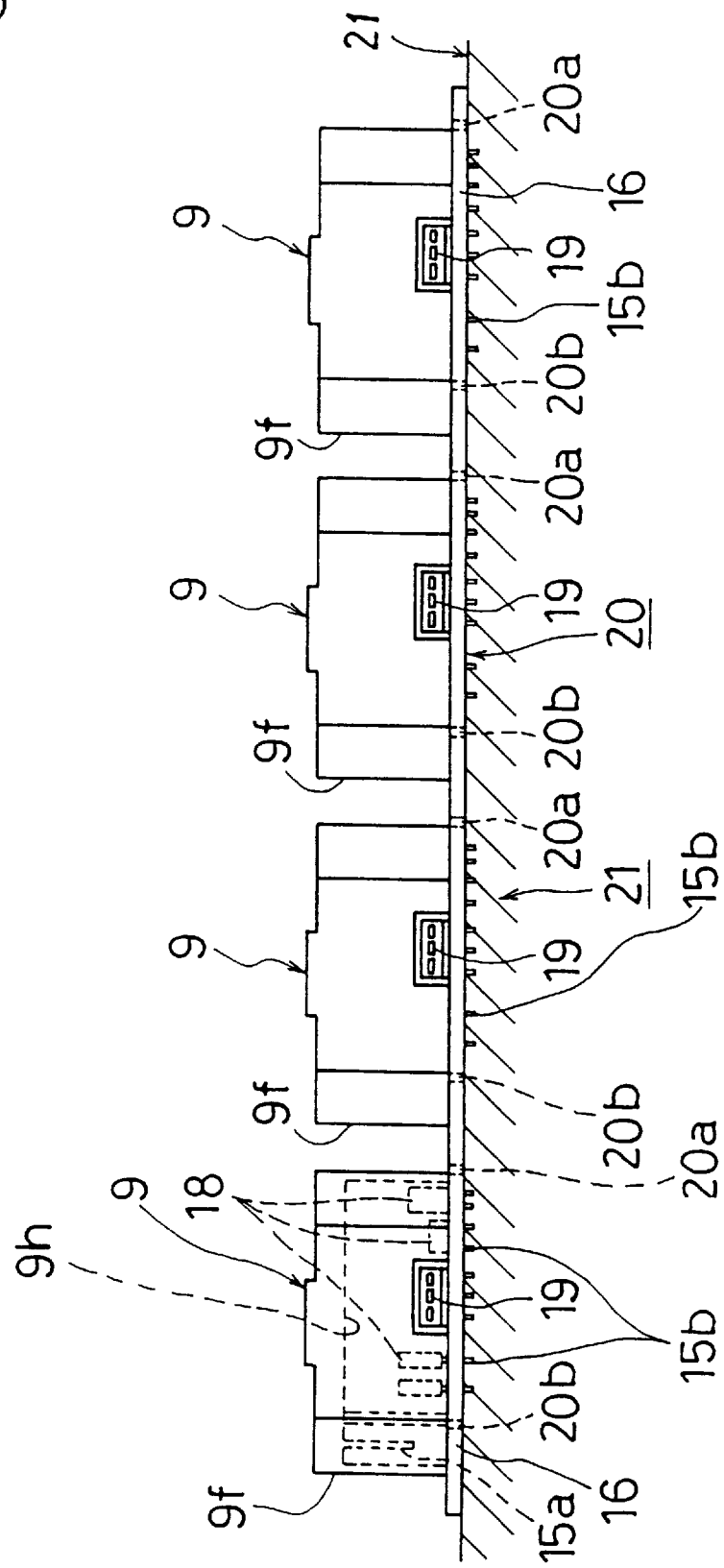
FIG. 6 is a side view of the substrate onto which electric components, and so forth, are to be mounted, showing the preferred embodiment of the present invention.

Then, as shown in FIG. 6, a soldering process is done by dipping the underside of the printed substrate 20 in solder contained in the solder tank 21, thereby performing soldering at one time the terminals 15b, 19 of the electric components 18 together with the lead terminals. In the soldering process, it is possible to perform soldering at one time on all of the terminals 15b, 19 for a number of substrates 16, shortening the period of time for soldering and hence achieving large-scale production.

In this manner, the printed substrate 20 is immersed at the entire underside thereof in solder of the solder tank 21 and raised therefrom, so that solder is adhered to the printed substrate 20 only to the lead terminals of the electrical components 18 and the male connector 19 as well as the terminals 15b, 19, thereby soldering them. This leaves free of solder adhered to a portion coated with epoxy resin or the like. On this occasion, soldering is done for the pole panel 9 with the opening of the connector 9f thereof being covered by the printed substrate 20, leaving free of solder on terminals 15a within the connector 9f.

Then, a process of cutting is performed along the V-grooves 20c, 20d for the substrates 20. The printed substrate 20, formed with the V-grooves 20c, 20d, are readily cut by bending it along a portion of the V-groove 20c, 20d. This makes possible cutting of a single printed substrate 20 into a number of substrates 16, and fixing these substrates 16 at one time onto the multiplicity of pole panels 9 on their undersides.

The present invention configured as above provides the following advantages.

(1) A pole panel for switches constituting a combination switch having a switch case on which an operating lever is pivotally supported for swing-operation, a base having the switch case detachably attached by receiving therein, a pole panel arranged on the underside of the switch case so that fixed contacts thereof are in contact with movable contacts, the pole panel for switches comprising an opening formed in an underside of the pole panel, terminals respectively formed integral with the fixed contacts to project into the opening, and a substrate provided to cover the opening. It is therefore possible to accommodate electric components in the opening and to solder the electric components on the substrate, providing efficient arrangement of various electric circuits within a limited space.

(2) The pole panel for switches may be structured such that terminals of the pole panel are inserted through the substrate for being soldered at the underside thereof, the substrate has electric components mounted thereon, and the electric components have terminals all of which are inserted through the substrate for being soldered at the underside thereof. It is therefore possible to solder all of the electric components on one surface of the substrate at one time, reducing the number of processes for soldering and, hence, the operation time period. This makes possible automatic soldering using machines.

(3) The pole panel for switches may be structured such that the electric component comprises a flasher unit or an intermittent wiper unit. It is therefore possible to provide a flasher unit or an intermittent wiper unit within a limited space underneath the pole panel.

(4) A method of fabricating a pole panel for switches constituting a combination switch having a switch case on which an operating lever is pivotally supported for swing-operation, a base having the switch case detachably attached by receiving therein, a pole panel arranged on the underside of the switch case so that fixed contacts are in contact with movable contacts, the method comprising the steps of: an opening process of forming through-openings in a substrate to substantially follow the contour of the opening of the pole panel; a cutting process of forming V-grooves along extension of a straight line connecting between the through-opening and the through-opening; a parts-mounting process of inserting from above terminals of the electric components and terminals of the pole panel into through-holes of the substrate; a soldering process of soldering the terminals of the electric components and the terminals of the pole panel projecting from an underside of the substrate; and a cutting process of cutting along the V-grooves formed in the substrate. It is therefore possible to mount a multiplicity of pole panels onto respective substrates at one time, greatly reducing assembling time.

(5) The method of fabricating a pole panel for switches may comprise a soldering process wherein soldering is performed with a connector opened downward of the pole panel covered over by the substrate, and the cutting process is carried out by cutting away a portion of the substrate covering over the connector. It is therefore possible to prevent the terminals from adhering with solder thereto when performing soldering.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A pole panel for a combination switch having a switch case (7) on which an operating lever (1) is pivotally supported for swing-operation, a base (22) having the switch case (7) detachably attached by receiving therein, and a pole panel (9) arranged on the underside of the switch case (7) so that fixed contacts (14) of the pole panel (9) are in contact with movable contacts, the pole panel comprising:

an opening (9h) formed in an underside of the pole panel (9);

terminals (15b) respectively formed integral with the fixed contacts (14) to project into the opening (9h); and a substrate (16) provided to cover the opening (9h), said terminals (15b) of the pole panel (9) extending through said substrate (16).

2. The pole panel according to claim 1, wherein the terminals (15b) of the pole panel (9) are inserted through the substrate (16) and soldered at the underside of the substrate (16).

3. The pole panel according to claim 2, wherein the substrate (16) has electric components (18) mounted thereon, and the electric components (18) have terminals all of which are inserted through the substrate (16) and soldered at the underside of the substrate (16).

4. The pole panel according to claim 3, wherein the electric components (18) comprise at least one of a flasher unit or an intermittent wiper unit.

5. A method of fabricating a pole panel for a switch having a switch case (7) on which an operating lever (1) is pivotally supported for swing-operation, a base (22) having the switch case (7) detachably attached by receiving therein, and a pole panel (9) arranged on the underside of the switch case (7) so that fixed contacts (14) of the pole panel (9) are in contact with movable contacts, the method comprising the steps of:

an opening process of forming through-openings (20a, 20b) in a substrate (16) to substantially follow the contour of an opening (9h) in an underside of the pole panel (9);

a cutting process of forming V-grooves (20c) along extension of a straight line connecting between the through-opening (20a) and the through-opening (20b);

a parts-mounting process of inserting from the above terminals of electric components (18) and terminals (15b) of the pole panel (9) into through-holes (16a) of the substrate (16);

a soldering process of soldering the terminals of the electric components (18) and the terminals (15b) of the pole panel (9) projecting from an underside of the substrate (16); and a cutting process of cutting along the V-grooves (20c) formed in the substrate (16).

6. A method of fabricating a pole panel according to claim 5, wherein the soldering process is done with a connector (9f) opened downward of the pole panel (9) covered over by the substrate (16), and the cutting process is carried out by cutting away a portion of the substrate (16) covering over the connector (9f).

7. A combination switch comprising:

a switch case (7) having a movable panel (6) in which an operating lever (1) is inserted for pivotal movement, said movable panel (6) having movable contacts (12, 13) on an underside thereof;

a pole panel (9) arranged on an underside of the switch case (7), said pole panel (9) having fixed contacts (14) in contact with the movable contacts (12, 13), the pole panel comprising:

an opening (9h) formed in an underside of the pole panel (9);

terminals (15b) respectively formed integral with the fixed contacts (14), said terminals (15b) projecting downwardly into the opening (9h); and a substrate (16) provided to cover the opening (9h), the terminals (15b) of the pole panel (9) extending through the substrate (16) and being soldered at an underside of the substrate (16).

8. The combination switch according to claim 7, wherein the substrate (16) has electric components (18) mounted thereon, and the electric components (18) have terminals extending through the substrate (16) and soldered at the underside of the substrate (16).

9. The combination switch according to claim 8, wherein the electric components (18) comprise at least one of a flasher unit or an intermittent wiper unit.

10. The combination switch according to claim 7, further comprising a cover (17) in engagement with the pole panel (9), the substrate being interposed between the cover (17) and the pole panel (9).

11. The combination switch according to claim 7, wherein said switch case (7) has an engaging piece (7e) having a hole formed therein, said hole of the engaging piece (7e) being engaged in an engaging projection (9c) of said pole panel (9), thereby connecting together said switch case (7) and said pole panel (9).

* * * * *